United States Patent
Lee et al.

(10) Patent No.: US 8,888,667 B2
(45) Date of Patent: Nov. 18, 2014

(54) CLAMP DEVICE FOR ELASTIC BAND

(75) Inventors: Yuta Lee, Kaohsiung (TW); Po-Ming Yang, Kaohsiung (TW)

(73) Assignee: ZMI Electronics, Ltd., Kaohsiung (TW)

( * ) Notice: Subject to any disclaimer, the term of this patent is extended or adjusted under 35 U.S.C. 154(b) by 302 days.

(21) Appl. No.: 13/473,766

(22) Filed: May 17, 2012

(65) Prior Publication Data

US 2013/0116098 A1      May 9, 2013

(30) Foreign Application Priority Data

Nov. 9, 2011 (TW) .............................. 100140909 A

(51) Int. Cl.
| | | |
|---|---|---|
| A63B 21/00 | (2006.01) | |
| A63B 21/055 | (2006.01) | |
| F16B 2/10 | (2006.01) | |
| A63B 23/12 | (2006.01) | |
| A63B 21/04 | (2006.01) | |
| F16B 1/02 | (2006.01) | |

(52) U.S. Cl.
CPC ............... A63B 21/0555 (2013.01); F16B 2/10 (2013.01); A63B 21/0557 (2013.01); A63B 21/1469 (2013.01); A63B 21/1484 (2013.01); A63B 23/1254 (2013.01); A63B 21/0428 (2013.01); A63B 21/00043 (2013.01); F16B 1/02 (2013.01)
USPC ............... 482/121; 482/126; 24/489; 24/517; 24/521; 24/327

(58) Field of Classification Search
USPC ............. 482/121, 126; 24/489, 517, 521, 327
See application file for complete search history.

(56) References Cited

U.S. PATENT DOCUMENTS

| | | | | |
|---|---|---|---|---|
| 3,032,849 | A | * | 5/1962 | Cohen et al. ..................... 24/569 |
| 4,084,299 | A | * | 4/1978 | Noda .............................. 24/504 |
| 4,723,865 | A | | 2/1988 | Rochau |
| 5,598,608 | A | | 2/1997 | Naslund |
| 2004/0255436 | A1 | | 12/2004 | Fujii |
| 2006/0217247 | A1 | | 9/2006 | Potak et al. |

FOREIGN PATENT DOCUMENTS

GB         275098         8/1927

OTHER PUBLICATIONS

International Search Report and Written Opinion mailed Jan. 25, 2013, for related PCT application PCT/US2012/064069 (9 pgs).

\* cited by examiner

*Primary Examiner* — Jerome w Donnelly
(74) *Attorney, Agent, or Firm* — Stinson Leonard Street LLP

(57) ABSTRACT

A clamp device is for use with an elastic band and includes first and second clamp components and a coupling unit. The first clamp component has a resiliently deformable clamping arm portion connected to one end of a connecting arm portion, cooperating therewith to define a clearance, and defining a clamping side. The second clamp component has a clamping side disposed to confront that of the first clamp component. The coupling unit couples the two clamp components together in a manner that permits relative movement of the clamp components between a non-clamping state and a clamping state. In the clamping state, the clamping arm portion of the first clamp component deforms to contract the clearance and the clamping sides of the clamp components clamp cooperatively and tightly a portion of the elastic band therebetween.

20 Claims, 10 Drawing Sheets

CLAMP DEVICE FOR ELASTIC BAND

CROSS-REFERENCE TO RELATED APPLICATION

This application claims priority to Taiwanese Application No. 100140909, filed on Nov. 9, 2011, which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates to a clamp device, more particularly to a clamp device for an elastic band.

2. Description of Related Art

Elastic resistance training is commonly used for the purpose of training exercise and rehabilitation therapy etc., which basically utilize external resistance to cause muscle contraction to increase muscle strength. Work stress, everyday living pressure and the lack of exercise and muscle training for a long period of time can cause physical pain. At such times, muscle in each area of the body must be exercised correctly to increase the muscle support for spinal cord or joints etc., resulting in a more complete therapy and effectively lowering the chance of relapse.

The elastic band commonly used in elastic resistance training is utilized for its material property of high elasticity (high extension rate), and therefore when the elastic band is pulled, it provides restoring force, through which muscle contraction is forced to achieve the effect of muscle training. The use of elastic resistance on training requires one to know how much resistance is to be set for training. As for elastic bands, different colors and thicknesses represent different elastic resistance coefficients. A lower resistance coefficient elastic band can be used in the beginning, and later on, an elastic band with increased strength can be formed by folding an elastic band or stacking two elastic bands together for training of higher intensity. Moreover, an elastic band is light-weight and affordable, and can be used with minimal space or equipment requirement. Therefore, it provides high practicality and convenience for individuals exercising at home or a group of people training together.

However, during actual operation, a user merely grips each end of the elastic band with both hands to start different types of training movement. Sometimes, when the pulling force is too great, the user will lose grip, and both hands will be thrown in the direction in which force is applied and might strike surrounding objects. Particularly, the patient's safety is of concern during rehabilitation, where the patient might have insufficient grip on the band.

There is a clamp device sold on the market that comes with a handle, which retains the elastic band on the clamp device by tying the band thereto, and thus the retaining strength depends on the tightness and the way it is tied. Nonetheless, when a patient applies insufficient strength or incorrect tying method, there is a risk of the elastic band coming off during usage due to insufficient retaining strength or tightness.

SUMMARY OF THE INVENTION

Therefore, an object of the present invention is to provide a clamp device for an elastic band that is both safe and convenient to use.

According to the present invention, a clamp device is for use with an elastic band and comprises first and second clamp components and a coupling unit.

The first clamp component has a connecting arm portion and a clamping arm portion connected to one end of the connecting arm portion. The clamping arm portion cooperates with the connecting arm portion to define a clearance therebetween and is resiliently deformable relative to the connecting arm portion. The clamping arm portion defines a clamping side that faces away from the connecting arm portion.

The second clamp component has a clamping side disposed to confront the clamping side of the first clamp component.

The coupling unit couples the first and second clamp components together in a manner that permits relative movement of the first and second clamp components between a non-clamping state and a clamping state. In the non-clamping state, the clamping sides of the first and second clamp components are disposed to permit movement of the elastic band therebetween. On the other hand, in the clamping state, the clamping sides of the first and second clamp components are disposed close to each other to result in deformation of the clamping arm portion of the first clamp component to contract the clearance and to enable the clamping sides of the first and second clamp components to clamp cooperatively and tightly a portion of the elastic band therebetween.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF EXEMPLARY EMBODIMENTS

Figure 1:
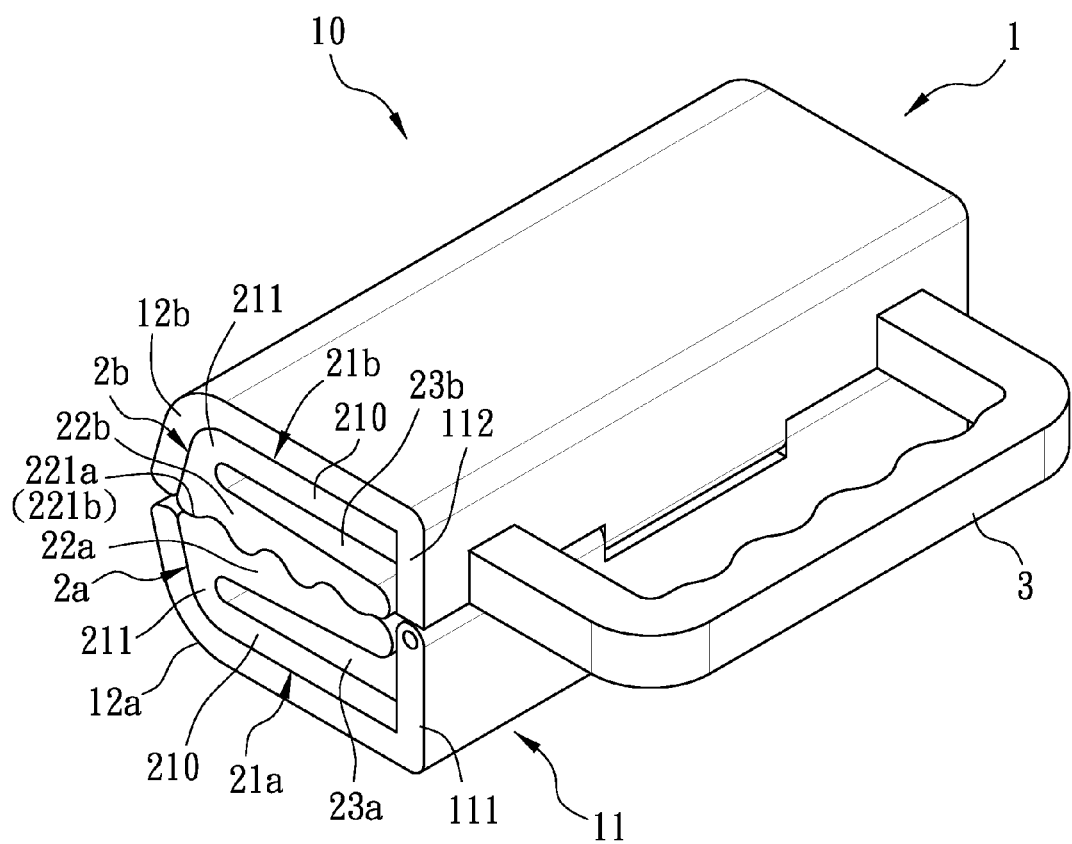
FIG. 1 is a perspective view of the first preferred embodiment of a clamp device according to the present invention.

Before the present invention is described in greater detail with reference to the accompanying preferred embodiments, it should be noted herein that like elements are denoted by the same reference numerals throughout the following description.

Figure 2:
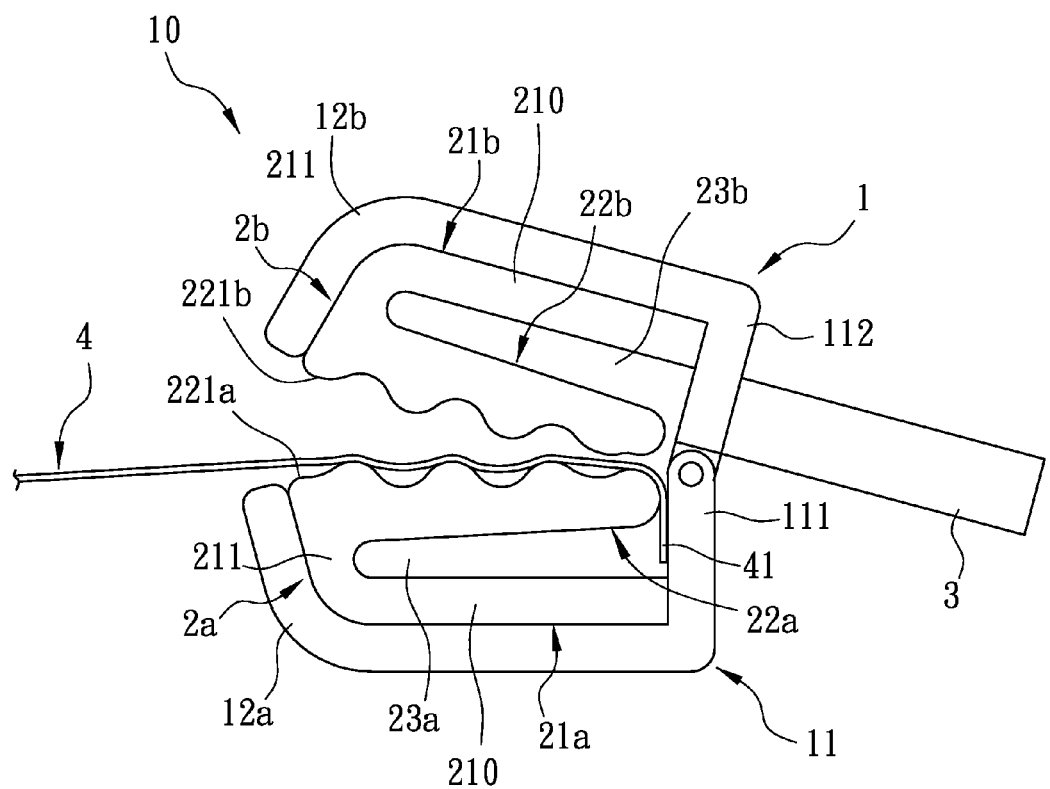
FIG. 2 is a schematic side view of the first preferred embodiment to illustrate first and second clamp components in a non-clamping state.

Referring to FIGS. 1 and 2, the first preferred embodiment of a clamp device 10 according to the present invention comprises a coupling unit 1, first and second clamp components 2a, 2b, and a grip 3 provided on the coupling unit 1. The coupling unit 1 includes a coupling part 11 and first and second clamp-mounting parts 12a, 12b. The coupling part 11 includes a first pivot section 111 and a second pivot section 112 coupled pivotally to each other. The first and second clamp-mounting parts 12a, 12b extend in a same direction from the first and second pivot sections 111, 112, respectively.

The first clamp component 2a, which is made of a material having sufficient stiffness, has a connecting arm portion 21a mounted on an inner side of the first clamp-mounting part 12a, and a clamping arm portion 22a connected to one end of the connecting arm portion 21a. In this embodiment, the connecting arm portion 21a includes a fixing section 210 mounted to the first clamp-mounting part 12a, and a connecting section 211 connected at one end to the fixing section 210 and at another end to the clamping arm portion 22a. In this embodiment, the fixing section 210, the connecting section 211 and the clamping arm portion 22a are configured such that the first clamp component 2a is generally U-shaped and opens toward the coupling part 11 of the coupling unit 1. The clamping arm portion 22a cooperates with the connecting arm portion 21a to define a clearance 23a therebetween and is resiliently deformable relative to the connecting arm portion 21a. The clamping arm portion 22a defines a clamping side 221a that faces away from the connecting arm portion 21a, and extends toward the coupling part 11.

The second clamp component 2b has a clamping side 221b disposed to confront the clamping side 221a of the first clamp component 2a. In this embodiment, the second clamp component 2b has a configuration similar to that of the first clamp component 2a. In particular, the second clamp component 2b is also made of a material having sufficient stiffness, and has a connecting arm portion 21b mounted on an inner side of the second clamp-mounting part 12b, and a clamping arm portion 22b connected to one end of the connecting arm portion 21b. Similar to the first clamp component 2a, the connecting arm portion 21b includes a fixing section 210 mounted to the second clamp-mounting part 12b, and a connecting section 211 connected at one end to the fixing section 210 and at another end to the clamping arm portion 22b. The fixing section 210, the connecting section 211 and the clamping arm portion 22b of the second clamp component 2b are also configured such that the second clamp component 2b is generally U-shaped and opens toward the coupling part 11 of the coupling unit 1. The clamping arm portion 22b cooperates with the connecting arm portion 21b to define a clearance 23b therebetween and is resiliently deformable relative to the connecting arm portion 21b. The clamping arm portion 22b defines a clamping side 221b that faces away from the connecting arm portion 21b, and extends toward the coupling part 11.

Figure 4:
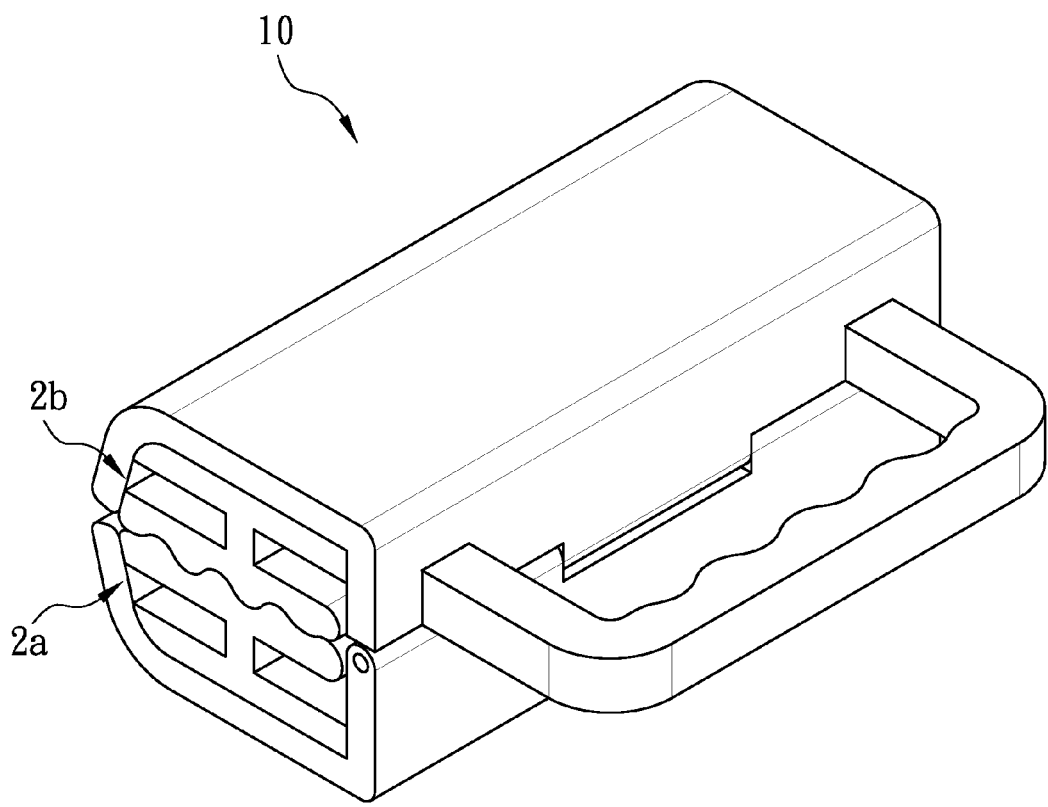
FIG. 4 is a perspective view of a clamp device with modified first and second clamp components.

While each of the first and second clamp components 2a, 2b is illustrated as being generally U-shaped in this embodiment, the shape thereof should not be limited in this respect. As shown in FIG. 4, which is a modification of the first preferred embodiment, one or both of the first and second clamp components 2a, 2b may be generally H-shaped.

The coupling unit 1 couples the first and second clamp components 2a, 2b together in a manner that permits relative movement of the first and second clamp components 2a, 2b, such as by manually moving the first and second clamp-mounting parts 12a, 12b toward or away from each other, between a non-clamping state and a clamping state.

As shown in FIG. 2, by forcing apart the first and second clamp-mounting parts 12a, 12b to dispose the first and second clamp components 2a, 2b in the non-clamping state, the clamping sides 221a, 221b of the first and second clamp components 2a, 2b are disposed apart to permit placement of an end portion 41 of an elastic band 4 therebetween.

Figure 3:
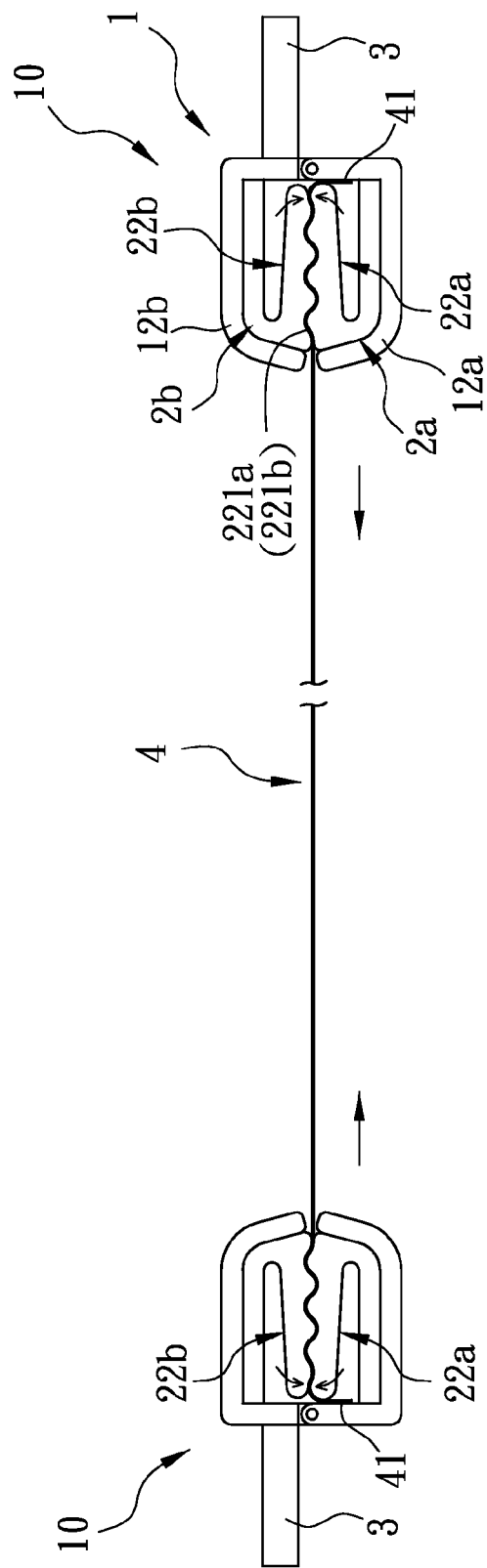
FIG. 3 illustrates an exercise apparatus that incorporates the clamp device of the first preferred embodiment.

As shown in FIG. 3, by forcing together the first and second clamp-mounting parts 12a, 12b to dispose the first and second clamp components 2a, 2b in the clamping state, the clamping sides 221a, 221b of the first and second clamp components 2a, 2b are disposed close to each other to result in deformation of the clamping arm portions 22a, 22b to contract the clearances 23a, 23b and to enable the clamping sides 221a, 221b of the first and second clamp components 2a, 2b to clamp cooperatively and tightly the end portion 41 of the elastic band 4 therebetween. Preferably, when the end portion 41 of the elastic band 4 is placed on the clamping side 221a, the tip of the end portion 41 is extended beyond the tip of the clamping side 221a to ensure that the end portion 41 is effectively clamped by the clamping arm portions 22a, 22b.

Repeating the above-mentioned steps enables another clamp device 10 to clamp onto the other end portion 41, after which, the user can use both hands to manipulate the grip 3 of each clamp device 10 and begin muscle training movements. When the user begins movement, such as straightening both arms and then opens both arms towards both sides of the body, the elastic band 4 having elasticity will be stretched due to pulling force, which produces restoring forces towards the center of the elastic band 4 at both end portions 41, respectively. At this time, the clamping arm portions 22a, 22b will be deformed along the arrow directions to enable the clamping sides 221a, 221b to clamp onto the elastic band 4 with better tightness. The harder the user pulls the elastic band 4, the greater the force that is applied by the clamping sides 221a, 221b onto the elastic band 4. Furthermore, the clamping sides 221a, 221b are preferably formed with a wavy pattern and cooperate with each other such that the contact surface area and the friction force between the clamping sides 221a, 221b and the elastic band 4 is increased.

To release the elastic band 4, the first and second clamp-mounting parts 12a, 12b are simply opened by hand to cause the first and second clamp components 2a, 2b to return to a non-clamping state shown in FIG. 2.

Further, the coupling unit 1 can be configured to grip elastic bands 4 of various widths and thicknesses. The preferred range of band width is from 10 mm to 200 mm, and more preferably from 50 mm to 150 mm. The elastic band 4 may have a thickness generally between 0.1 mm to 2.00 mm, and more preferably between 0.15 mm and 1.0 mm. Two elastic bands 4 may be stacked to form a combined thickness from 0.2 mm to 4.00 mm. It is understood that this invention should not be limited to the disclosed dimensional parameters.

In the above-mentioned example, a pair of clamp devices 10 are used together. Obviously, the clamp device 10 can be used alone. For instance, the user can use the clamp device 10 to secure one end portion 41 of the elastic band 4, with the other end portion 41 of the elastic band 4 tied to a pole.

By the above-mentioned design, the clamp device 10 of the present invention possesses the following advantages:

Added User Safety:

The first and second clamp components 2a, 2b are resiliently deformable with the pull from the elastic band 4, and therefore the clamping force is strong. The harder the elastic band 4 is pulled, the greater the clamping force due to the increase of deformation of at least one clamping arm portion 22a, 22b, and therefore the elastic band 4 does not slide off the clamp device 10. Furthermore, the clamping sides 221a, 221b are preferably wavy such that contact surface area and friction force are increased between the clamping sides 221a, 221b and the elastic band 4. Accordingly, the clamp device has added user safety.

Increased Convenience:

With the pivotal coupling of the first and second pivot sections 111, 112, the first and second clamp-mounting parts 12a, 12b can be opened by hand. This allows insertion of the elastic band 4 when the first and second clamp component 2a, 2b are in the non-clamping state, or the clamping of the elastic band 4 in the clamping state. Such operation is simple and convenient. The clamp device 10 requires minimal components to provide sufficient clamping force, and such simple structure is small and light weight for making it convenient to carry around.

Adaptability:

Due to the clamping arm portions 22a, 22b being resiliently deformable, the clamp device 10 is able to clamp tightly onto the elastic band 4 that is thinner in size, and also clamp onto the elastic band 4 that is thicker in size without being damaged.

Figure 5:
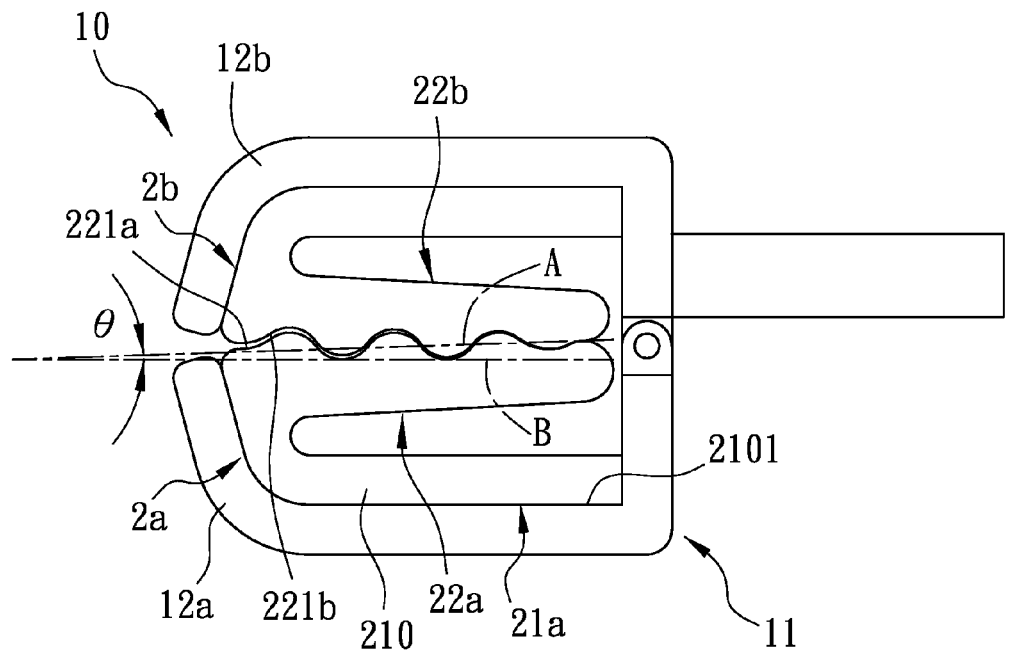
FIG. 5 is a schematic side view of the second preferred embodiment of a clamp device according to the present invention, illustrating first and second clamp components in a non-clamping state.

FIG. 5 shows the second preferred embodiment of a clamp device 10 according to this invention. The second preferred embodiment differs from the first embodiment in the following: The fixing section 210 of the connecting arm portion 21a of the first clamp component 2a has a base surface 2101 that is mounted to the inner side of the first clamp-mounting part 12a. The clamping side 221a of the first clamp component 2a is disposed on an extension plane (A) that extends from an inner side proximate to the coupling part 11 to an outer side distal from the coupling part 11. The extension plane (A) forms an angle θ with a reference plane (B) that is parallel to the base surface 2101 of the fixing section 210. In this embodiment, the second clamp component 2b has features corresponding to the above-mentioned features of the first clamp component 2a.

Figure 6:
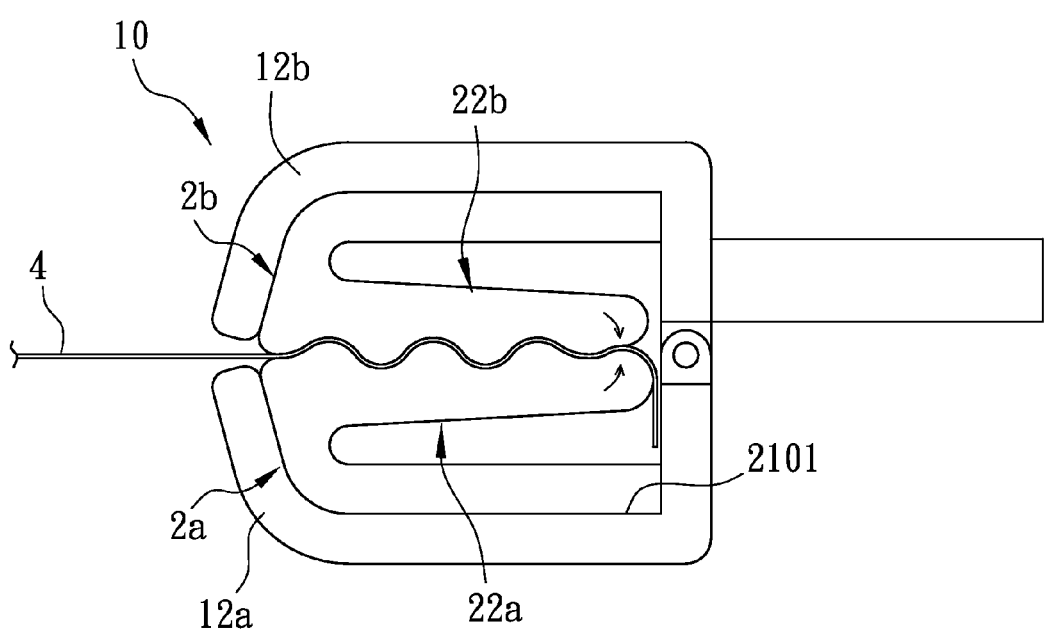
FIG. 6 is a view similar to FIG. 5, but illustrating the first and second clamp components in a clamping state.

Preferably, the clamping side 221a, 221b of at least one of the first and second clamp components 2a, 2b is patterned for engagement with the portion of the elastic belt 4 (see FIG. 6). In this embodiment, the clamping sides 221a, 221b of both of the first and second clamp components 2a, 2b are formed with a wavy pattern. However, one or both of the clamping sides 221a, 221b may be flat in other embodiments.

By virtue of the angle θ formed between the planes (A, B), the clamping sides 221a, 221b may abut against each other proximate to the coupling part 11 and may form a gap therebetween at parts distal from the coupling part 11 when the first and second clamp portions 2a, 2b are in the clamping state without the elastic band 4 placed therebetween. Therefore, referring to FIG. 6, when the first and second clamp portions 2a, 2b are in the clamping state with the elastic band 4 placed therebetween, the clamping arm portions 22a, 22b are already slightly deformed to generate clamping forces without the user having to exert a force for stretching the elastic band 4. Accordingly, when the user exerts the force for stretching the elastic band 4, larger clamping forces would be generated by the clamping arm portions 22a, 22b to further promote safety during use.

Figure 7:
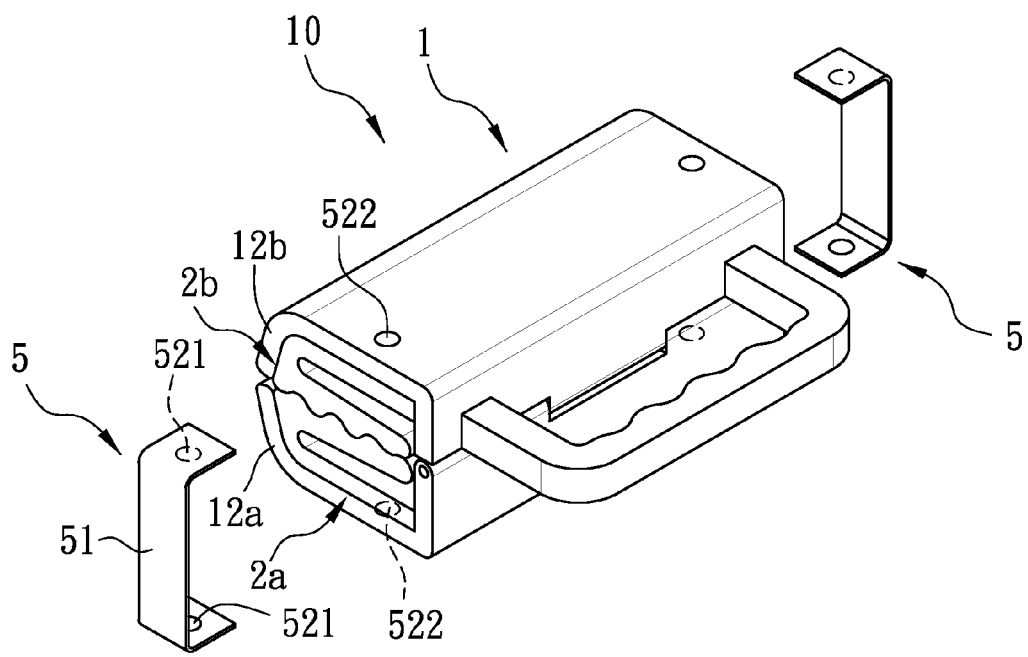
FIG. 7 is a partly exploded perspective view of the third preferred embodiment of a clamp device according to the present invention.
Figure 8:
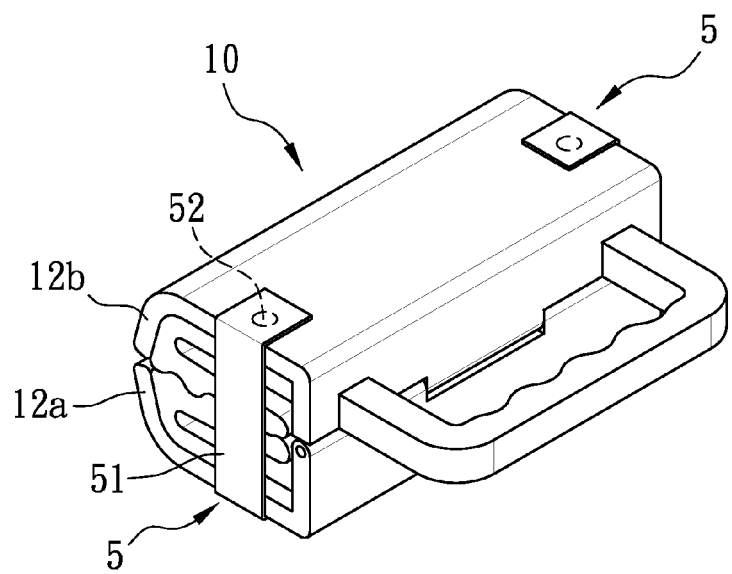
FIG. 8 is an assembled perspective view of the third preferred embodiment, illustrating an auxiliary clamp unit attached to a support unit.

FIGS. 7 and 8 illustrate the third preferred embodiment of a clamp device 10 according to the present invention. The third preferred embodiment differs from the first embodiment in the following: This embodiment further comprises two auxiliary clamp units 5. Each auxiliary clamp unit 5 includes a clamp member 51 and an attachment mechanism 52 provided on the clamp member 51 and the first and second clamp-mounting parts 12a, 12b for attaching releasably the clamp member 51 to the coupling unit 1 in a manner that the clamp member 51 clamps together the first and second clamp-mounting parts 12a, 12b to releasably lock the first and second clamp components 2a, 2b in the clamping state. Preferably, the attachment mechanism 52 includes a pair of first engaging members 521 provided on the clamp member 51 and a pair of second engaging members 522 provided on the first and second clamp-mounting parts 12a, 12b, respectively.

Figure 9:
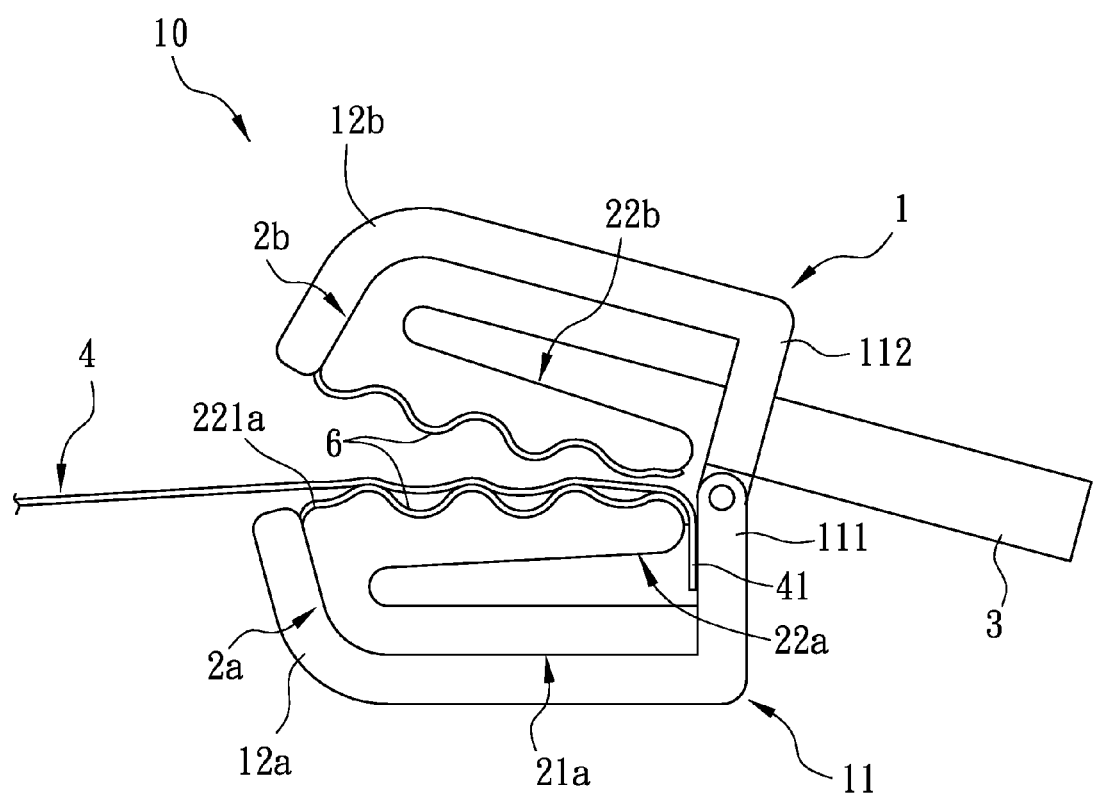
FIG. 9 is a schematic side view of the fourth preferred embodiment of a clamp device according to the present invention.

Referring to FIG. 9, the fourth preferred embodiment of a clamp device 10 according to this invention is shown to be similar to the first preferred embodiment. However, in this embodiment, the clamping side 221a, 221b of one or both of the first and second clamp components 2a, 2b is provided with an anti-slip member 6, which is made of a material with a large friction coefficient such as rubber, for friction engagement with the portion 41 of the elastic band 4. By virtue of the anti-slip member 6, friction between the clamp device 10 and the elastic band 4 may be increased to further stabilize the clamping effect.

Figure 10:
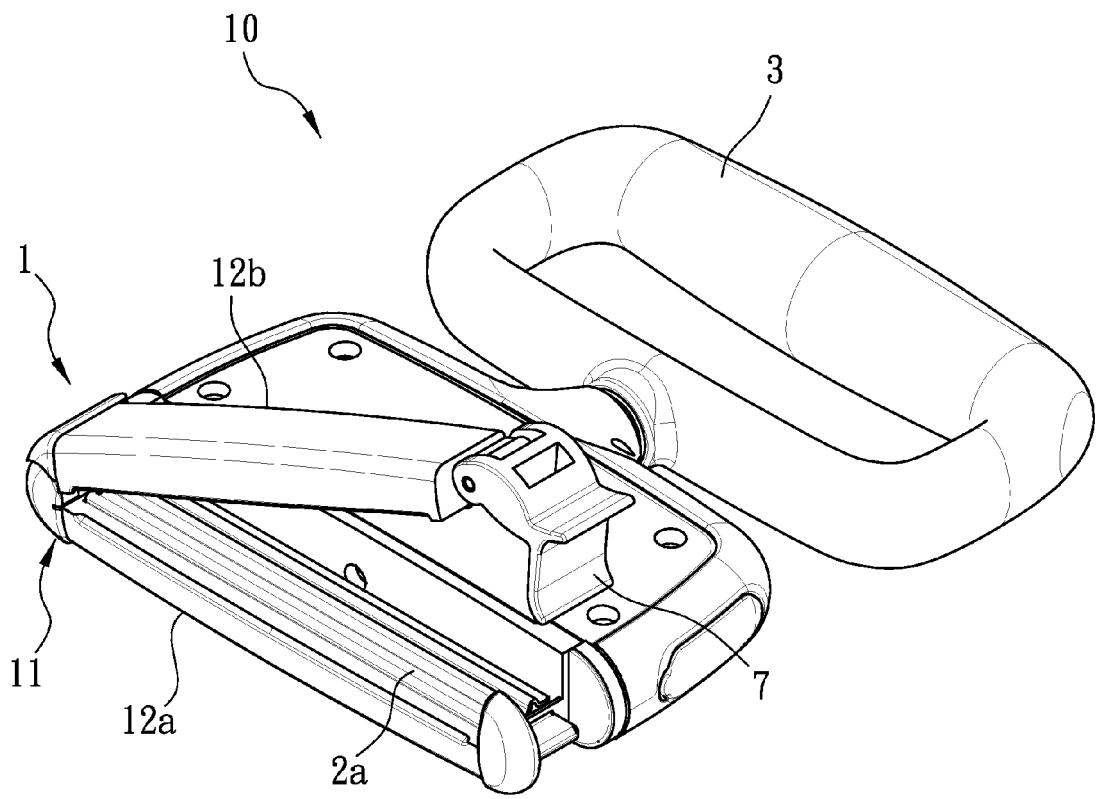
FIG. 10 is a perspective view of the fifth preferred embodiment of a clamp device according to the present invention.
Figure 11:
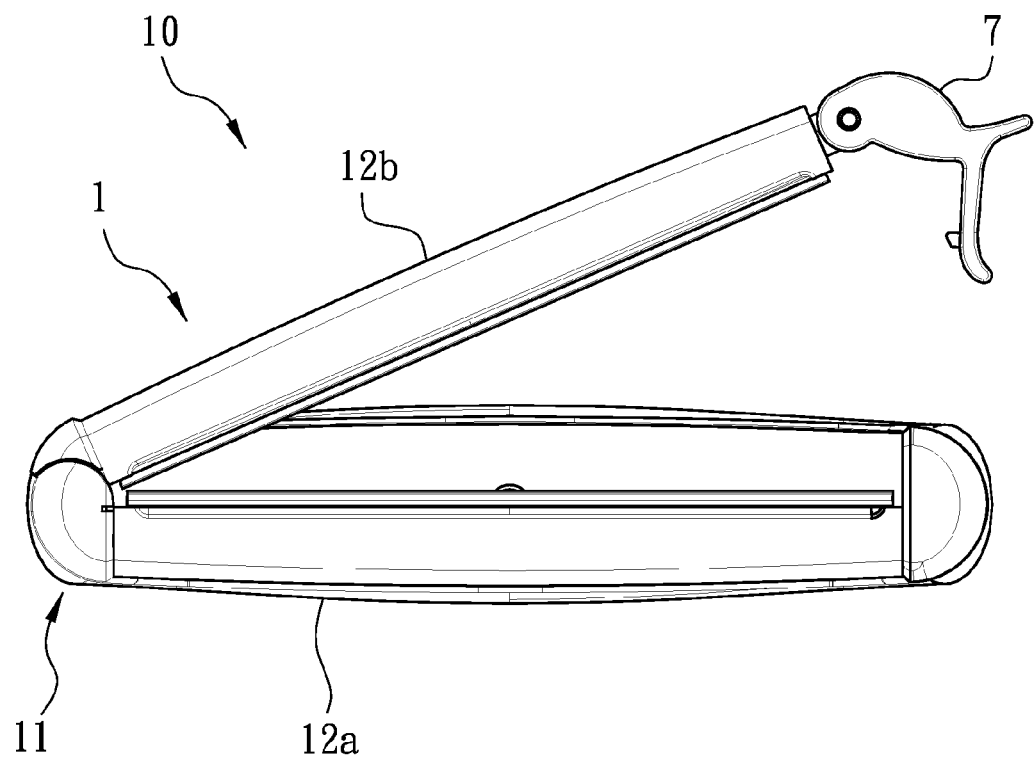
FIG. 11 is a schematic side view of the fifth preferred embodiment, illustrating first and second clamp components in a non-clamping state.
Figure 12:
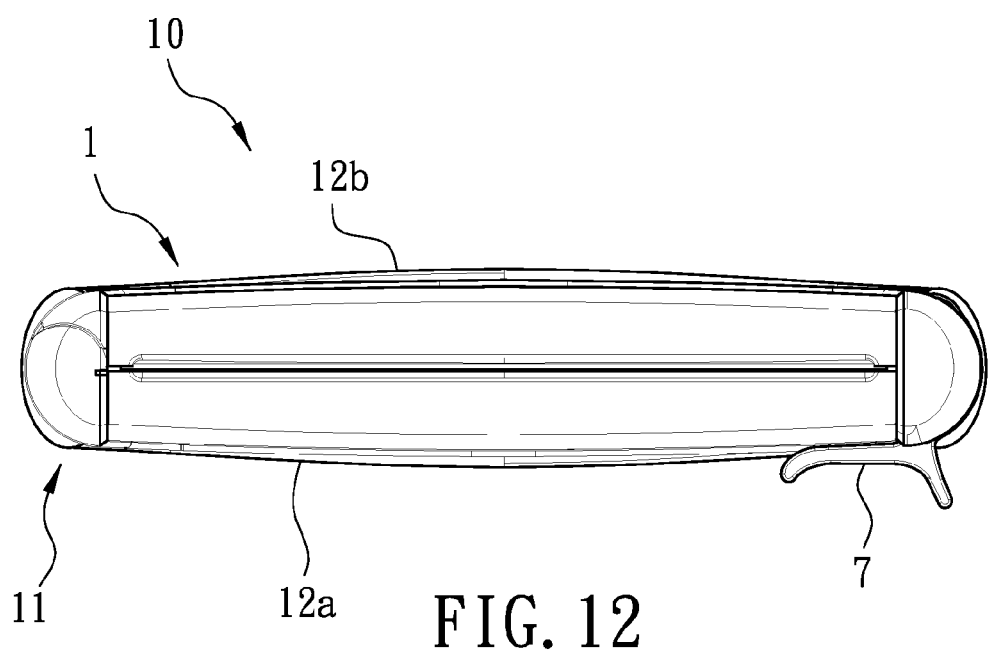
FIG. 12 is a view similar to FIG. 11, but illustrating the first and second clamp components in a clamping state.

Referring to FIG. 10, the fifth preferred embodiment of a clamp device 10 according to the present invention is shown to be similar to the first preferred embodiment. However, in this embodiment, each of the first and second clamp-mounting parts 12a, 12b further has a short lateral edge portion and a long lateral edge portion longer than the short lateral edge portion, and the coupling part 11 interconnects the short lateral edge portions of the first and second clamp-mounting parts 12a, 12b. Such an arrangement makes it possible to clamp different parts of the elastic band 4 (instead of being limited to clamping an end portion of the same) for added convenience. Moreover, the clamp device 10 further comprises a fastener component 7 disposed at one of the first and second clamp-mounting parts 12a, 12b. Referring to FIGS. 11 and 12, after placing the elastic band 4 (see FIG. 9), the fastener component 7 engages releasably the other one of the first and second clamp mounting parts 12a, 12b to releasably lock the first and second clamp components 2a, 2b in the clamping state.

Figure 13:
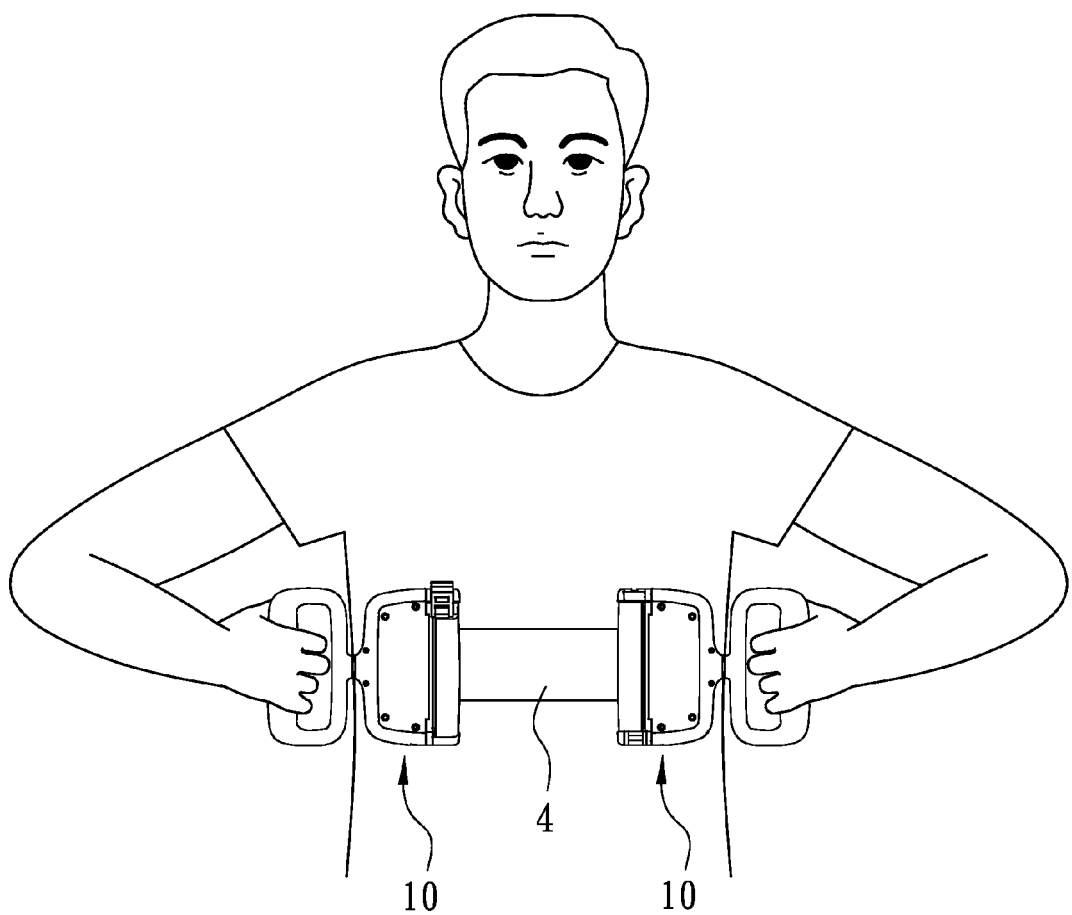
FIG. 13 illustrates a user operating an exercise apparatus including a pair of the clamp devices at opposite ends of an elastic band.

FIG. 13 illustrates a user operating an exercise apparatus including a pair of the clamp devices 10 at opposite ends of an elastic band 4.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A clamp device for an elastic band, said clamp device comprising:

a first clamp component having a connecting arm portion and a clamping arm portion connected to said connecting arm portion, said clamping arm portion cooperating with said connecting arm portion to define a clearance therebetween and being resiliently deformable relative to said connecting arm portion, said clamping arm portion defining a first clamping side;

a second clamp component having a second clamping side disposed to confront said first clamping side of said first clamp component; and wherein said first and second clamp components are coupled together in a manner that permits relative movement of said first and second clamp components between a non-clamping state and a clamping state, wherein, in the non-clamping state, said first and second clamping sides of said first and second clamp components are disposed to permit movement of the elastic band therebetween, wherein, in the clamping state, said first and second clamping sides of said first and second clamp components are disposed close to each other to result in deformation of said clamping arm portion of said first clamp component to contract said clearance and to enable said first and second clamping sides of said first and second clamp components to clamp cooperatively and tightly a portion of the elastic band therebetween.

2. The clamp device as claimed in claim 1, wherein said second clamp component has a connecting arm portion and a clamping arm portion connected to said connecting arm portion of said second clamp component, said clamping arm portion of said second clamp component cooperating with said connecting arm portion of said second clamp component to define a clearance therebetween and being resiliently deformable relative to said connecting arm portion of said second clamp component, said clamping arm portion of said second clamp component defining said second clamping side.

3. The clamp device as claimed in claim 2, further comprising a coupling part and first and second clamp-mounting parts that are spaced apart from each other and that extend substantially in a same direction from said coupling part, each of said first and second clamp-mounting parts having an inner side mounted with said connecting arm portion of a respective one of said first and second clamp components.

4. The clamp device as claimed in claim 3, wherein said coupling part includes a first pivot section and a second pivot section coupled pivotally to each other, each of said first and second clamp-mounting parts extending from a respective one of said first and second pivot sections.

5. The clamp device as claimed in claim 3, wherein said connecting arm portion of each of said first and second clamp components includes a fixing section mounted to the respective one of said first and second clamp-mounting parts, and a connecting section connected at one end to said fixing section and at another end to said clamping arm portion of the respective one of said first and second clamp components.

6. The clamp device as claimed in claim 5, wherein each of said first and second clamp components is generally U-shaped and opens toward said coupling part.

7. The clamp device as claimed in claim 5, wherein each of said first and second clamp components is generally H-shaped.

8. The clamp device as claimed in claim 1, wherein said first clamp component is one of generally U-shaped and generally H-shaped.

9. The clamp device as claimed in claim 1, wherein at least one of said first and second clamping sides is patterned for engagement with the portion of the elastic band.

10. The clamp device as claimed in claim 9, wherein at least one of said first and second clamping sides is formed with a wavy pattern.

11. The clamp device as claimed in claim 1, further comprising a coupling unit comprising a coupling part and first and second clamp-mounting parts that are spaced apart from each other and that extend substantially in a same direction from said coupling part, each of said first and second clamp-mounting parts having an inner side mounted with a respective one of said first and second clamp components.

12. The clamp device as claimed in claim 11, wherein:
said connecting arm portion of said first clamp component includes a fixing section having a base surface that is mounted to the respective one of said first and second clamp-mounting parts and a connecting section connected at one end to said fixing section and at another end to said clamping arm portion of said first clamp component;

said first clamping side of said first clamp component is disposed on an extension plane that extends from an inner side proximate to said coupling unit to an outer side distal from said coupling unit; and said extension plane forms an angle θ with a reference plane that is parallel to said base surface.

13. The clamp device as claimed in claim 12, wherein at least one of said first and second clamping sides is patterned for engagement with the portion of the elastic band.

14. The clamp device as claimed in claim 13, wherein at least one of said first and second clamping sides is formed with a wavy pattern.

15. The clamp device as claimed in claim 11, further comprising at least one auxiliary clamp unit, said auxiliary clamp unit including a clamp member and an attachment mechanism provided on said clamp member and said first and second clamp-mounting parts for attaching releasably said clamp member to said coupling unit in a manner that said clamp member clamps together said first and second clamp-mounting parts to releasably lock said first and second clamp components in the clamping state.

16. The clamp device as claimed in claim 11, wherein each of said first and second clamp-mounting parts further has a short lateral edge portion and a long lateral edge portion longer than said short lateral edge portion, said coupling part interconnecting said short lateral edge portions of said first and second clamp-mounting parts.

17. The clamp device as claimed in claim 11, further comprising a fastener component disposed at one of said first and second clamp mounting parts and engageable releasably with the other one of said first and second clamp mounting parts to releasably lock said first and second clamp components in the clamping state.

18. The clamp device as claimed in claim 11, wherein said coupling unit is provided with a grip.

19. The clamp device as claimed in claim 1, wherein at least one of said first and second clamping sides is provided with an anti-slip member for friction engagement with the portion of the elastic band.

20. An exercise apparatus comprising:
an elastic band; and
a clamp device including:
a first clamp component having a connecting arm portion and a clamping arm portion connected to said connecting arm portion, said clamping arm portion cooperating with said connecting arm portion to define a clearance therebetween and being resiliently deformable relative to said connecting arm portion, said clamping arm portion defining a first clamping side;

a second clamp component having a second clamping side disposed to confront said first clamping side of said first clamp component;

wherein said first and second clamp components are coupled together in a manner that permits relative movement of said first and second clamp components between a non-clamping state and a clamping state;

wherein, in the non-clamping state, said first and second clamping sides of said first and second clamp components are disposed to permit movement of said elastic band therebetween; and wherein, in the clamping state, said first and second clamping sides of said first and second clamp components are disposed close to each other to result in deformation of said clamping arm portion of said first clamp component to contract said clearance and to enable said first and second clamping sides of said first and second clamp components to clamp cooperatively and tightly a portion of said elastic band therebetween.

* * * * *